United States Patent [19]

Carr

[11] 4,226,016

[45] Oct. 7, 1980

[54] METHOD OF REMOVING A TRACK PIN FROM A TRACK SHOE

[75] Inventor: Nathaniel Carr, Detroit, Mich.

[73] Assignee: The United States of America as represented by the secretary of the Army, Washington, D.C.

[21] Appl. No.: 16,776

[22] Filed: Mar. 2, 1979

[51] Int. Cl.$^3$ ........................ B23P 19/04; B25B 33/00

[52] U.S. Cl. .................................... 29/426.4; 30/276; 81/8.1

[58] Field of Search ................ 29/427, 426, 235, 270, 29/282; 30/276; 81/8.1, 3 R

[56] References Cited

U.S. PATENT DOCUMENTS

| | | | |
|---|---|---|---|
| 1,195,220 | 8/1916 | Hendren | 81/8.1 |
| 2,731,714 | 1/1956 | Dudley | 29/427 |
| 2,849,906 | 9/1958 | Loveless | 81/3 R |

*Primary Examiner*—Milton S. Mehr

*Attorney, Agent, or Firm*—Peter A. Taucher; John E. McRae

[57] ABSTRACT

A method of removing a track pin from a track shoe comprising the step of rotating and advancing an annular cutter element into a rubber bushing that surrounds the pin. The teeth of the cutter element shred the rubber into particulates that can be removed during withdrawal of the cutter element from the annular space between the pin and track bore.

1 Claim, 5 Drawing Figures

Fig-3
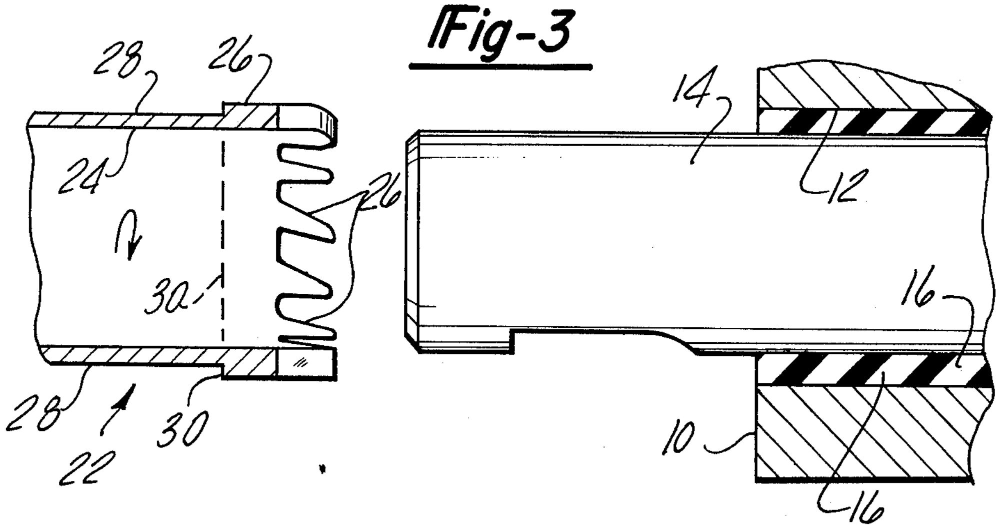
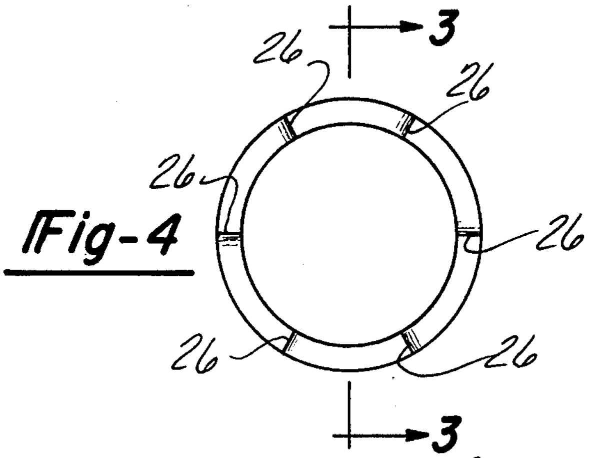
Fig-4
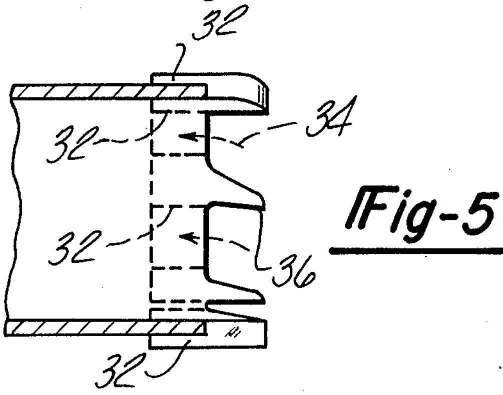
Fig-5

METHOD OF REMOVING A TRACK PIN FROM A TRACK SHOE

The invention described herein may be manufactured, used, and licensed by or for the Government for governmental purposes without payment to me of any royalty thereon.

BACKGROUND AND SUMMARY OF THE INVENTION

This invention relates to a method for removing a rubber bushing from the annular space between a relatively large diameter bore in a track shoe and a relatively small diameter track pin. Typically the pin has a diameter of approximately $1\frac{1}{4}$ inch, and the track shoe bore has a diameter of about $1\frac{1}{2}$ inch; the rubber bushing has a radial thickness of about $\frac{1}{8}$ inch. U.S. Pat. No. 2,234,927 illustrates one track shoe-pin assembly for which the invention is applicable; other type tracks (single pin or double pin) may also utilize the invention. The invention departs from conventional practice in that the rubber bushing is removed by a cutting operation, whereas conventional practice is to utilize chemicals and/or heating and/or mechanical press techniques. The invention is believed to achieve an improved action as respects shorter operational times, lesser expenditure for machinery or equipment, and lesser energy expenditure.

THE DRAWINGS

FIG. 3 is a fragmentary view of the FIG. 1 structure in association with a cutter element used in practice of the present invention.

FIG. 4 is an end view of the cutter element shown in FIG. 3.

FIG. 5 is a fragmentary view of a modified cutter element.

Figure 1:
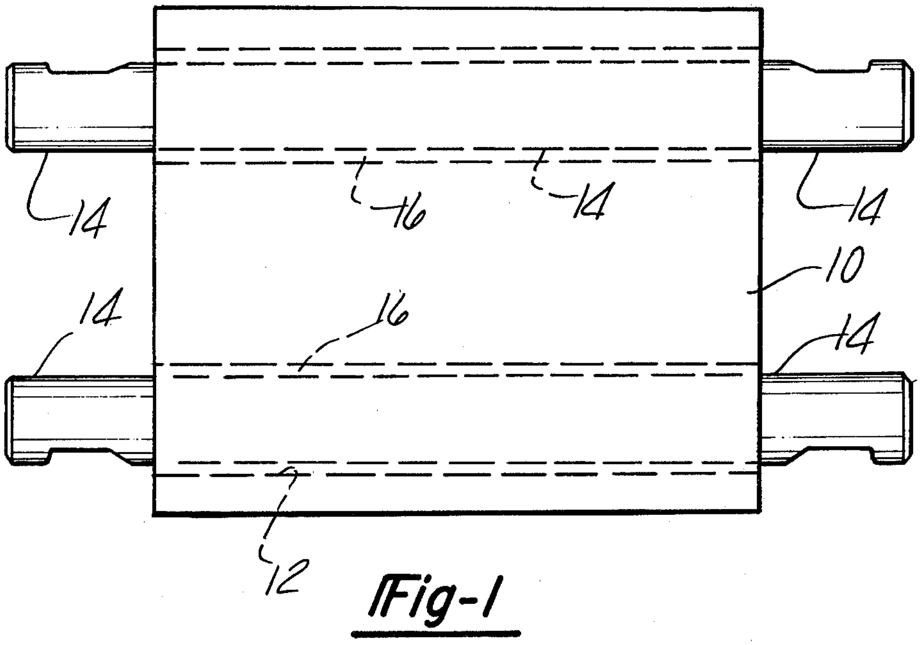
FIG. 1 is a plan view of a conventional track shoe-pin assembly.
Figure 2:
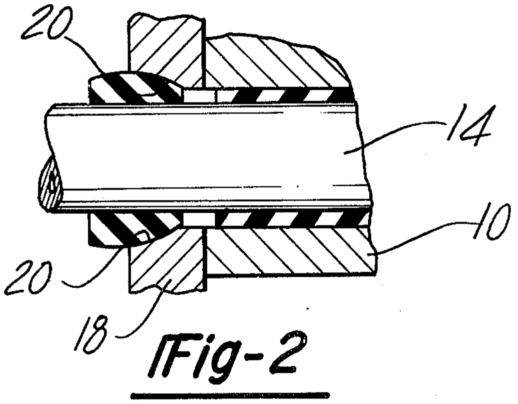
FIG. 2 is a fragmentary view of a die used in fabrication of the FIG. 1 shoe-pin assembly.

Referring in greater detail to the drawings, FIG. 1 is a plan view of a track shoe constructed generally similarly to the shoe structure shown in U.S. Pat. No. 2,234,927. The shoe body 10 is formed with two cylindrical bores 12 that receive cylindrical pins 14 and rubber bushings 16. Initial fabrication of the pins into the shoe is accomplished by bonding relatively large diameter rubber rings to each pin, and forcing the pin-ring assembly into one of the cylindrical bores, as described in U.S. Pat. No. 2,234,927. FIG. 2 of the present drawings shows a plate-like die element 18 that can advantageously be used to accomplish compression of the rubber rings; as the pin is moved to the right the tapered passage 20 in plate 18 compresses and elongates each rubber ring.

The present invention is directed to a cutter element structure and method for removing the compressed rubber material from each bore 12 when the shoe structure has been in service for a sufficient length of time to necessitate rebuild of worn track; in-service use vulcanizes the rubber to bore 12, thereby complicating the rubber-removal operation. Prior practice has been to remove the compressed rubber material by chemical treatment and/or induction heating and/or mechanical pressure. Chemical treatment usually involves immersion of the shoe-pin assembly in a bath comprised of equal parts of sodium nitrate and potassium nitrate heated to a temperature between 500° F. and 550° F.; after about 10 minutes the shoe-pin assembly is removed from the bath and placed in a press that exerts axial pressure on each pin to effect separation of the pin from the shoe. Complete removal of rubber still adhered to the wall of each bore 12 can be accomplished by sandblasting processes in a tumbleblast machine. In the alternate process using induction heating the metal surfaces are heated to approximately 700° F. to weaken the bond between the rubber and metal surfaces. Mechanical pressure and sandblast processes are used in combination with the heating operation to clean the metal surfaces. FIG. 3 fragmentarily shows an annular cutter element 22 having twelve teeth 26 in its right end surface. Inner side surface 24 of the cutter element has a slidable fit on pin 14; outer side surface 26 of the cutter element has a slidable fit in bore 12 so that the width of each cutter tooth 26 corresponds substantially to the radial thickness of rubber bushing 16. The outer surface of the cutter element is made to have a reduced diameter, as at 28. The defined lip or shoulder 30 apparently serves as a mechanism for withdrawing rubber particulates from the annular space between pin 14 and bore 12.

In use of the cutter mechanism element 22 is mounted in the chuck of a conventional horizontal drilling or milling machine so that element 22 can be simultaneously rotated and advanced axially toward bushing 16. As the cutter element teeth 26 engage the bushing they shred the rubber into particulates. After the teeth have advanced approximately two inches into the bushing the cutter element is retracted out of bore 12 while continuing to rotate. During the retraction stroke rubber particulates are exhausted from the annular space between pin 14 and bore 12. Such particulate exhaustion has been found to be greatly improved by the presence of reduced diameter section 28 and lip 30; when the cutter element was formed to have a constant diameter along its entire length the particulate exhaust action was not nearly as complete as when the cutter element was provided with lip 30; cutting action had to be halted prematurely. It is theorized that during the advance stroke of the cutter element into the rubber bushing the relatively high pressures at the tooth-rubber interface cause particulates to extrude through the slight clearance space between surfaces 12 and 26. When the outer surface of the cutter element is formed with relief surface 28 the particulate escape path is relatively short so that particulates can be more readily exhausted from the tooth-rubber interface, thereby permitting continued cutting action up to an axial depth of approximately two inches before the necessity for retracting the cutter element.

Ordinarily track shoe 10 has a width (parallel to the pin 14 axis) of at least eight inches. Therefore the cutter element must be cycled (advanced and retracted) four or more times in order to completely sever each pin 12 from its track shoe 10. In an optimum cutting process the surfaces of pin 14 and bore 12 will be completely cleaned of rubber traces without need for subsequent sandblast or honing operations.

FIG. 5 illustrates a modified cutter element structure that is formed with a rubber particulate escape slot 32 at the leading edge of each tooth. The contemplated action involves continuous escape of particulates through each slot in the arrow 34 direction. The leading edge 36 of each tooth may be cut at a backward angle, measured from the tooth tip to the root, to promote movement of particulates into each slot 32. As with the cutter structure of FIG. 3, the radial width of each tooth corresponds to the radial thickness of the rubber bushing.

I wish it to be understood that I do not desire to be limited to the exact details of construction shown and described for obvious modifications will occur to a person skilled in the art.

I claim:

1. A method for removing a compressed rubber bushing from an annular space between a relatively large diameter smooth cylindrical bore extending through a track shoe and a relatively small diameter track pin extending through said bore; said method including the steps of providing an annular cutter element with an internal diameter as a sliding fit on the pin and an external diameter as a sliding fit on the bore surface so that the annular thickness of the cutter element is the same as the annular thickness of the compressed rubber bushing; providing a series of cutting teeth on an end edge of the annular cutter element; providing a reduction in the external diameter of the cutter element at a locality spaced a very slight axial distance from the cutting teeth to form an inwardly-directed shoulder at the outer side surface of the cutting teeth; rapidly rotating and simultaneously advancing the annular cutter element against the rubber bushing for a depth of approximately two inches to form rubber particulates at the teeth-rubber interface; withdrawing the cutter element out of the cylindrical bore to enable the aforementioned shoulder to remove particulates from the bore, and repeating the steps of advancing and withdrawing the rotating cutter element until the cutting teeth have advanced entirely through the bushing material.

* * * * *